United States Patent
Miyamoto

(10) Patent No.: US 7,280,101 B2
(45) Date of Patent: Oct. 9, 2007

(54) FINGERTIP TACTILE-SENSE INPUT DEVICE AND PERSONAL DIGITAL ASSISTANT USING IT

(76) Inventor: Isshin Miyamoto, 21-101, Nata-Danchi, Higashi-ku, Fukuoka, 811-0205 (JP)

( * ) Notice: Subject to any disclaimer, the term of this patent is extended or adjusted under 35 U.S.C. 154(b) by 599 days.

(21) Appl. No.: 10/784,761

(22) Filed: Feb. 23, 2004

(65) Prior Publication Data

US 2004/0164968 A1     Aug. 26, 2004

Related U.S. Application Data

(63) Continuation of application No. PCT/JP02/08395, filed on Aug. 20, 2002.

(51) Int. Cl.
*G06F 3/02* (2006.01)
*G09G 5/00* (2006.01)

(52) U.S. Cl. ............................ 345/169; 345/173
(58) Field of Classification Search ............ 345/169, 345/170–178
See application file for complete search history.

(56) References Cited

U.S. PATENT DOCUMENTS 6,665,173 B2 * 12/2003 Brandenberg et al. ...... 361/680
6,909,424 B2 * 6/2005 Liebenow et al. .......... 345/169
6,995,752 B2 * 2/2006 Lu ............................. 345/174
2003/0044000 A1 * 3/2003 Kfoury et al. ......... 379/433.04

FOREIGN PATENT DOCUMENTS

| JP | 10-333778 A | * 12/1998 |
| JP | 2000-165492 | 6/2000 |
| JP | 2000-278391 | 10/2000 |

* cited by examiner

*Primary Examiner*—Amr A. Awad
*Assistant Examiner*—Michael Pervan
(74) *Attorney, Agent, or Firm*—John V. Stewart

(57) ABSTRACT

A fingertip tactile sense input device for a personal digital assistant capable of various input operations produced by a moving fingertip over projections recognized by the fingertip tactile sense. An input plate has a plurality of fingertip input projections and input control means that encodes an input signal when a projection is depressed. A fingertip can be moved over the input plate with the wrists fixed. The projections are disposed within a surface area outlined by an inverted generally egg-shaped curve C1 or C2, which is usable equally by the index fingertip of either hand.

17 Claims, 7 Drawing Sheets

FIG 2A
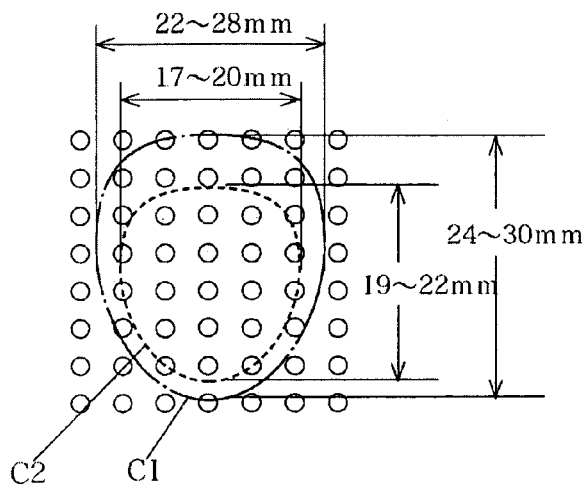
FIG 2B
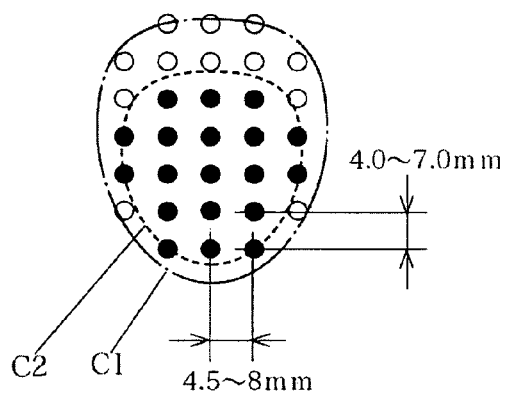
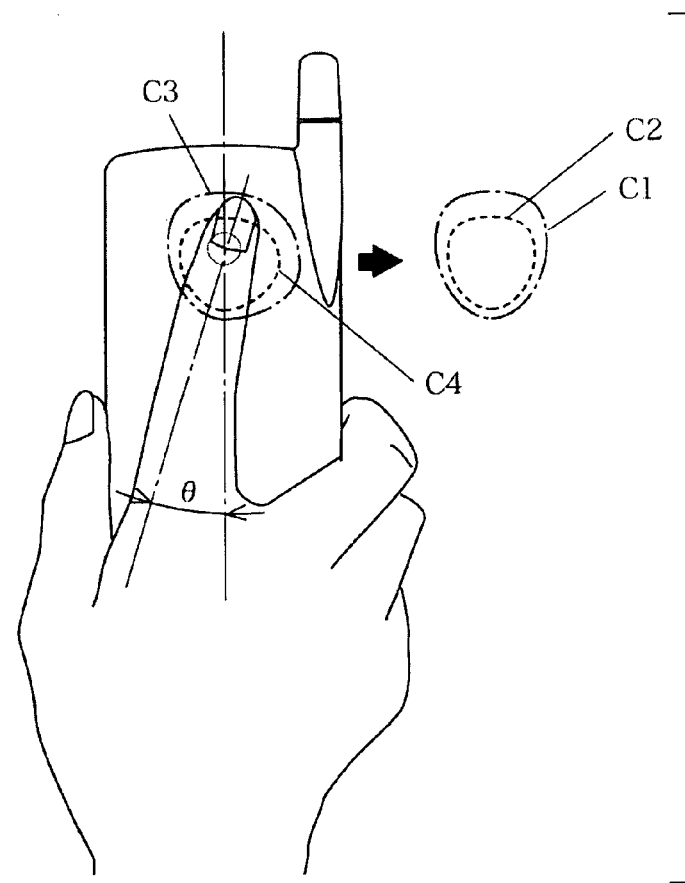
FIG 3

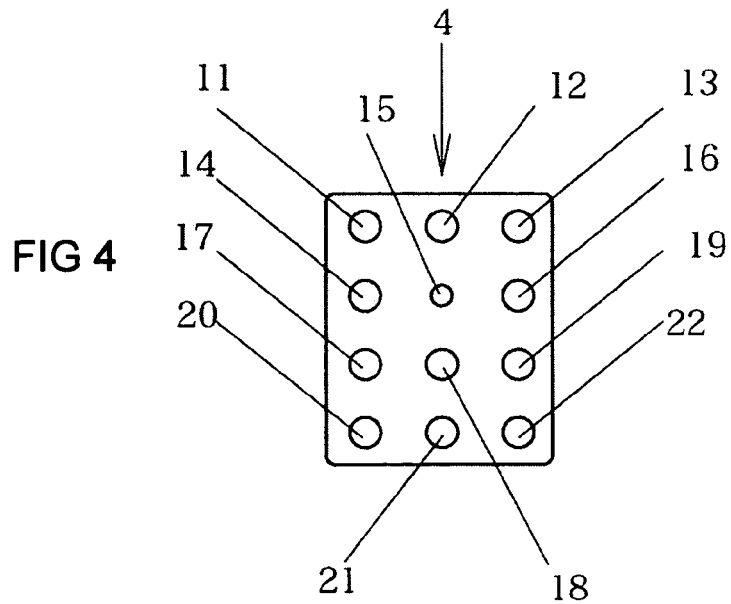
FIG 4
FIG 5A
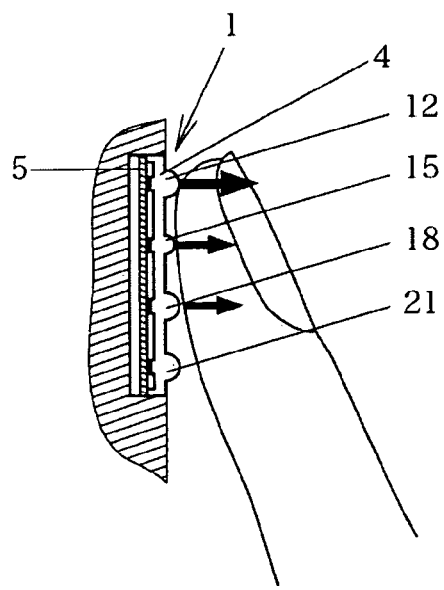
FIG 5B

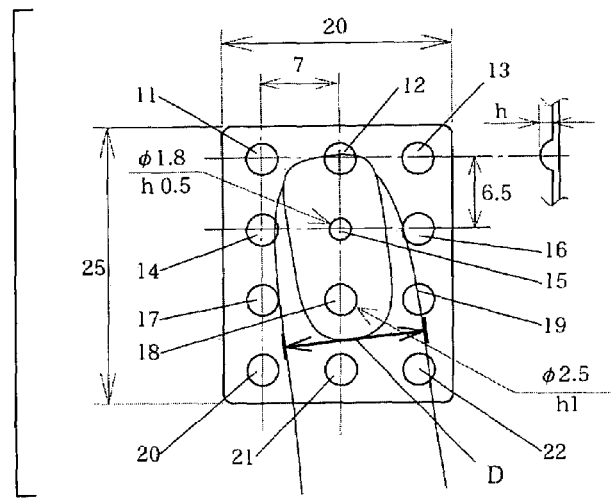
FIG 6
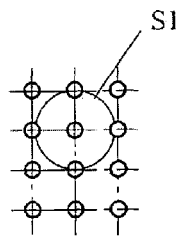
FIG 7A1   FIG 7A2
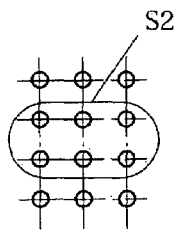
FIG 7B1   FIG 7B2
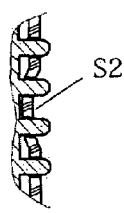
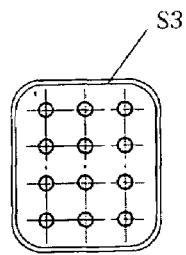
FIG 7C1   FIG 7C2
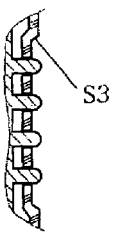
FIG 7D1   FIG 7D2
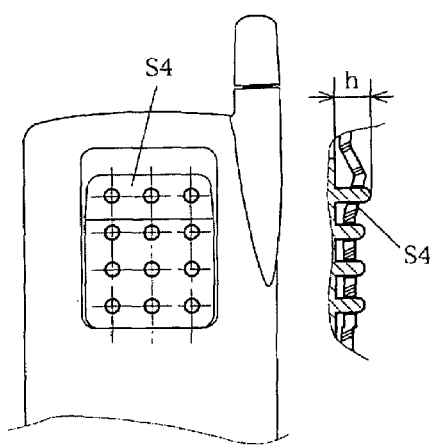

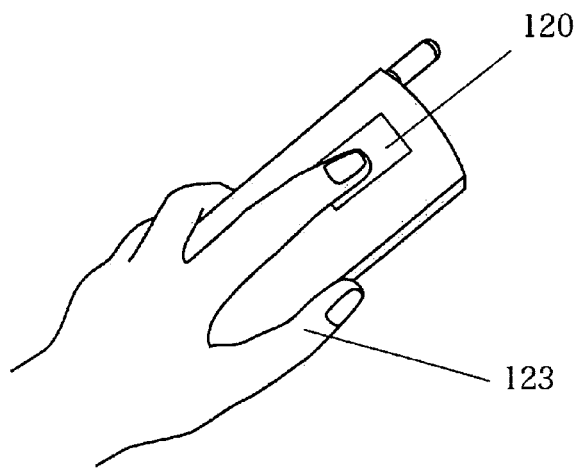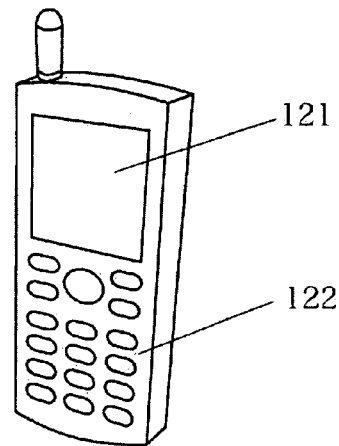
FIG 12A
PRIOR ART
FIG 12B
PRIOR ART
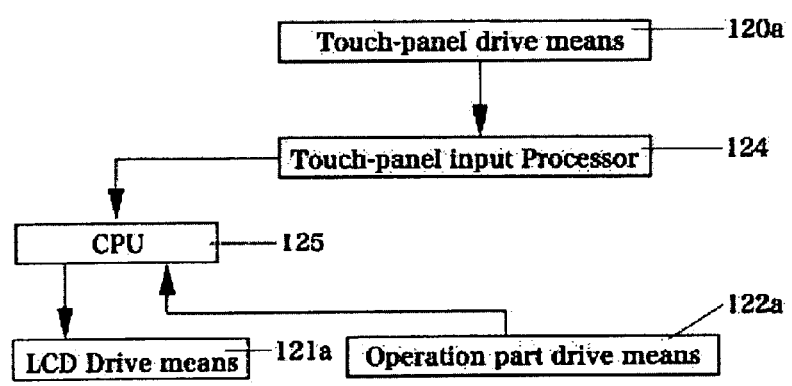
FIG 13
PRIOR ART

FINGERTIP TACTILE-SENSE INPUT DEVICE AND PERSONAL DIGITAL ASSISTANT USING IT

CROSS-REFERENCE TO RELATED APPLICATIONS

This application is a continuation of international application PCT/JP02/08395, with international filing date of Aug. 20, 2002.

BACKGROUND OF THE INVENTION

1. Field of the Invention

This invention relates to fingertip touch input devices for entering alphanumeric data into Personal Digital Assistants (PDAs), cellular phones, and other information terminals and electronic equipment, especially handheld ones.

2. Background Art

In recent years, Personal Digital Assistants (PDA), cellular phones, and Personal Handy Phone Systems (PHS) have be come popular. Such devices are miniaturized for convenient carrying. Various models are available. Some can receive and transfer image data, and some include a camera to obtain the image data.

NTT DoCoMo, Inc. of Japan is providing an Internet access service called i-mode that is used in Japan and some European countries. This service connects a cellular phone to the Internet. In order to connect a cellular phone to the Internet, the display screen on the cellular phone is made as large as possible, and more legible display screens came to be desired.

However, if a PDA uses the structure of a conventional key button array, there is a limit to the size of the display. This is because the key buttons in such an array are close to each other. Therefore, when a user pushes a key button with a finger, an adjoining key button may be pushed accidentally. To avoid simultaneously depressing two adjoining key buttons, the pitch of key buttons must generally be 8 mm-15 mm. This causes keypads be about 40 mm-50 mm wide and 50 mm-60 mm long, including a function key. A display screen on the same surface of a PDA as the keypad must be made smaller if the keypad is larger. Otherwise, the PDA must be made larger, making it inconvenient to carry.

Japanese patent JP,2000-165492 shows conventional key button structures for cellular phones. FIG. 11 herein shows such a prior art structure. A depression 101 is formed in the outer case 100 of a cellular phone. It receives a key button 102 having a backward projection 103. A dome 105 in a resilient sheet 104 gives a tactile click when the button is pressed. An electrically conducting foil 106 is printed on the dome 105. A conducting pattern 108 is formed in a substrate 107. A cushion 109 is provided in the depression 101. A lower case layer 111 is provided.

A hole 110 in the bottom of depression 101 receives the button projection 103. The dome 103 of sheet 104 is located under the button projection 103. When a button 102 is pressed, the user feels a click due to the resiliency of the dome. The printed wiring 106 on the underside of the dome contacts the pattern 108 of substrate 107. The key buttons 102 are sealed against the outer case 100 to prevent water or foreign matter from penetrating and damaging the internal electric parts.

A fingertip covers one key button 102, and only the surface area that can be pushed selectively, is required for a keypad. It is necessary to provide spacing between the key buttons of about 0.5-1.0 times the size of a key button so that two or more key buttons 102 are not pushed simultaneously. For this reason, if the size of each key button 102 is about 10 mm×10 mm, and the keypad array has a 3×8 array of buttons, the width of the keypad array is 50 mm-70 mm and the length is 105 mm-170 mm. The smallest possible keypad is about 50 mm wide and 80 mm long. This keypad limits the size of display screen that can be used. This is a serious limitation for a cellular phone or PHS, which can transmit and receive pictures and animations.

Japanese patent JP,2000-278391 shows a cellular phone with a handwriting input pad on the back of the case. FIGS. 12A, 12B, and 13 herein show such a prior art device. FIG. 12A is a back perspective view of a conventional cellular phone with a handwriting pad on the back. FIG. 12B is a front perspective view of the cellular phone of FIG. 12A. FIG. 13 is a block diagram of a conventional cellular phone that performs handwriting input on a pad on the back. In FIGS. 12A and 12B a touch panel 120 is mounted on the back side of a cellular phone. An LCD display 121 on the front of the cellular phone performs the various displays of a cellular phone. Key buttons 122 on the front of the phone are operated by a hand 123. FIG. 13 shows that the touch sensitive panel 120 is operated by a touch-panel drive means 120a, and the LCD display is operated by an LCD actuation drive 121a. Operation drive means 122a senses depression a key button 122 as an input signal.

The touch panel 120 can input handwritten lines and alphanumeric characters. Since this conventional cellular phone has a touch panel 120 on the back, it requires fewer front key buttons 122. This allows a larger LCD display 121. However, the operation of handwriting input is complicated, and it cannot create E-mail quickly. It is difficult to increase the precision of character recognition. A user inputs data while looking at the touch panel 120 on the back. The user must turn the phone over and view the front LCD display in order to verify input. This is user-unfriendly. The front key buttons 122 are fundamentally the same as the key buttons on a conventional Personal Digital Assistant.

As explained above, a conventional key button array on a Personal Digital Assistant requires key buttons large enough to allow a fingertip to push only one button at a time. For this reason conventional keypads including function keys are normally about 50 mm-70 mm wide and 105 mm-170 mm long. Even the smallest of these keypads is a problem for PDAs, cellular phones, and other handheld digital devices that display images and animations, because the keypad restricts the display screen size.

A conventional handwriting pad on the back of handheld digital devices can reduce the number of front key buttons, allowing a larger display screen on the front. However this has disadvantages as mentioned above. A better approach is needed to miniaturize a PDA while making the display as large as possible.

SUMMARY OF THE INVENTION

The object of the invention is provision of a smaller type of fingertip tactile-sense input device for entering various types of inputs on a handheld digital device such as a Personal Digital Assistant or cellular phone. Further objectives include provision of such an input device that can be sensed by touch, and that allows a larger display on handheld digital devices, and that provides functionality for a Personal Digital Assistant with high capability.

These objectives are met with an input plate located on the back of a handheld portable digital device. The plate has projections that sense the touch of a moving fingertip, and encode a corresponding input signal. There is no need to turn the handheld portable digital device around or move the user's wrist to operate this input device. The input projections are arranged in an egg-shaped surface area where a fingertip of the right or left hands can reach it equally. The egg-shaped area is of a size that supports various inputs by touch and provides tactile feedback.

A Personal Digital Assistant using this invention has a display screen on the front of the case, and the present tactile sense input device on the back of the case. This arrangement allows provision of both a large display and fingertip entry of a variety of inputs, thus offering a Personal Digital Assistant with high capability.

BRIEF DESCRIPTION OF THE DRAWINGS

The drawings illustrate the principles of the invention with examples of preferred arrangements and suggested dimensions of the invention. Actual product dimensions can be determined from these principles for a particular population of users. Front views of the input plate are normally seen from the back view of a Personal Digital Assistant on which the plate is mounted, since the plate is normally mounted on the back of a PDA.

FIG. 2A shows an array of projections and two generally egg-shaped outlines that define an area of usable projections C1 and an area of more easily usable projections C2, either of which area can be used for the input plate of this invention. vention.

FIG. 2B shows projections of FIG. 2A that can be included on the input plate, with example outline dimensions and projection spacing.

FIG. 3 shows the process of designing an area outline for the input projections.

FIG. 4 shows a front view of a fingertip tactile sense input device according to the invention. Note that this view is normally seen from the back view of the PDA on which the input device is mounted.

FIG. 5A is a side sectional view of the input device of FIG. 4 showing an example of pressure distribution of a fingertip when activating projection 12.

FIG. 5B is a display screen corresponding to FIG. 5A allowing the user to check the input from the front of the PDA.

FIG. 6 shows suggested size relationships between a fingertip and the projection array of this invention.

FIG. 7A1 is a view of an array of input projections protruding through individual holes in a surface that has a circular depressed portion.

FIG. 7A2 is a side sectional view of FIG. 7A1.

FIG. 7B1 is a view of an array of projections protruding through individual holes in a surface that has an oval depressed portion.

FIG. 7B2 is a side sectional view of FIG. 7B

FIG. 7C1 is a view of an array of projections protruding through individual holes in a depressed portion of a surface.

FIG. 7C2 is a side sectional view of FIG. 7C1.

FIG. 7D1 is a view of an array of projections protruding through individual holes in a surface that has a raised ridge portion.

FIG. 7D2 is a side sectional view of FIG. 7D1.

FIG. 12A is a prior art back perspective view of a conventional cellular phone with a handwriting pad on the back.

FIG. 12B is a prior art front perspective view of a conventional cellular phone.

FIG. 13 is a prior art block diagram of components of a conventional cellular phone that perform handwriting input on a pad on the back.

DETAILED DESCRIPTION

The invention is a touch sensitive input device 1 for portable handheld digital devices. It has plural projections that provide fingertip input and tactile feedback. An input controller codes an input signal when a moving fingertip presses a projection. The input projections are arranged in an egg-shaped plate area located where a fingertip of either the right or left hand can reach it, as shown in FIGS. 2B and 2C.

A plate size suitable for a touch input by minimal movement of a finger without wrist movement is within 3 times an average index fingerprint size, or about 24 mm-30 mm high and 22 mm-28 mm wide as shown by egg-shaped curve C1 in FIG. 2A. At least 12 input projections are provided in the input area, corresponding to ten alphanumeric keys and a "*" key and "#" key as shown in FIG. 4-FIG. 7D2. Each projection can be explored and pressed with a fingertip.

Figure 1A:
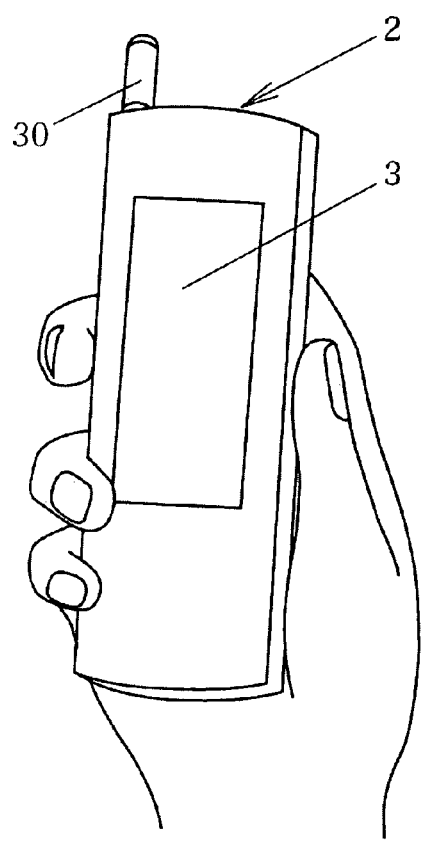
FIG. 1A is a perspective front view of a Personal Digital Assistant being operated with a fingertip input device on the back according to this invention.
Figure 1B:
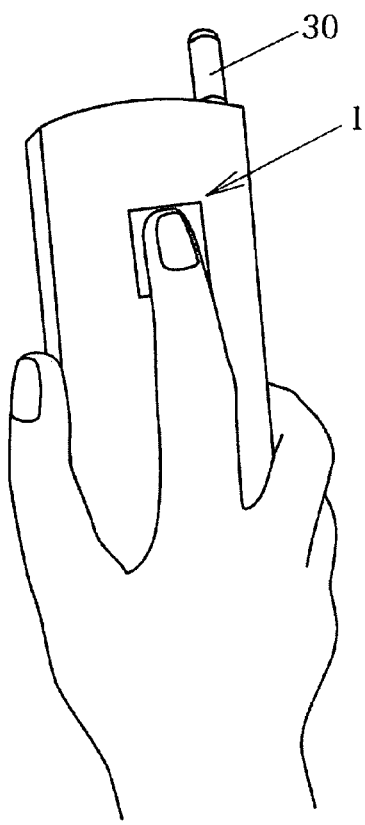
FIG. 1B is a perspective back view of a Personal Digital Assistant being operated with a fingertip input device on the back according to this invention.
Figure 8:
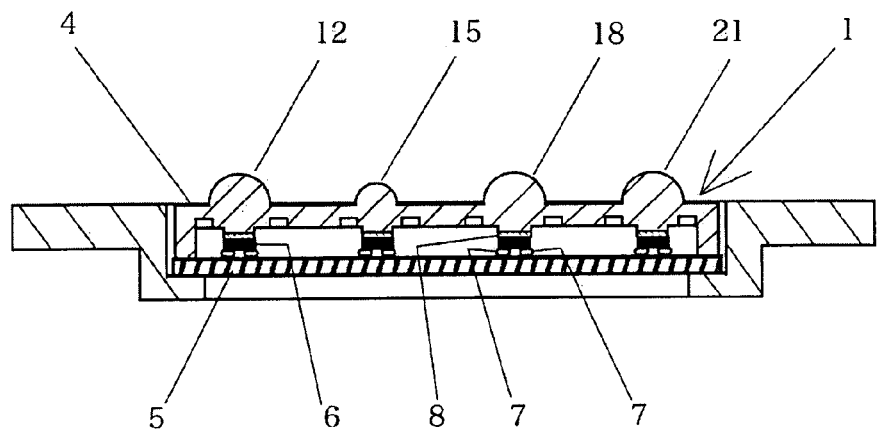
FIG. 8 is a side sectional view of a tactile-sense input device with input projections molded integrally on a flexible plate.

FIG. 1A shows the front of a Personal Digital Assistant 2 with a display screen 3 and antenna 30. FIG. 1B shows the present input device on the back of the PDA of FIG. 1A being used for input by exploring and pressing with a fingertip the position of a projection for producing input. FIG. 8 shows a side sectional view of some projections 12, 15, 18, and 21 on such an input device, which will be described later.

As shown in FIGS. 1A and 1B, a PDA is held with one hand in a position that allows the index finger to reach the home position of the input device. The input device is small enough to operate by moving only a finger, while the wrist is fixed. The size and shape for input device is designed shown in FIGS. 2A and 2B. A first egg-shaped area C1 can be reached by the index finger of the right or left hand, whichever hand is holding the PDA. This area C1 is the tactile sense recognition feasible region.

According to experiments, the area in which a fingertip of either hand can move reasonably freely and fully without moving the wrist is less than 1 to 2 times the fingertip breadth. A second egg-shaped curve C2 shows this area as 19 mm-22 mm high and 17 mm-20 wide. Area C2 is about 5 mm-8 mm less than C1 in every direction.

As shown in FIG. 2B, a preferred vertical pitch of the projections is 4.0 mm to 7.0 mm and a preferred lateral pitch is 4.5 mm to 8.0 mm. This allows 12 projections to fit completely within C2 in four rows with 3 projections per row.

Areas C1 and C2 are preferably laterally bisymmetric to allow equal use with the right or left hand. FIG. 3 shows how areas C1 and C2 are formed. A user normally holds a PDA as shown. In this holding position, the index finger has an angle θ of about 30 degrees from vertical. For this reason, the feasible input area C3 and the preferred input area C4 are laterally asymmetric about the vertical centerline of the PDA for a given hand. For a right hand, the area is larger on the right side of FIG. 3, as shown. For a left hand the area is larger on the left (not shown). However if the larger sides of C3 and C4 are eliminated, and smaller sides are mirrored across the vertical centerline, the resulting areas will be laterally symmetric and equally accessible for a right or left hand. This is how C1 and C2 are formed from the smaller lateral portions of C3 and C4 respectively.

As shown in FIG. 8, plural projections 12, 15, 18, and 21 are preferably formed integrally in input plate 4. The plate and projections are made of an electrically insulating material. A substrate 5 is located behind the input plate. An electrical contact 7 is printed on the substrate 5 behind each projection. A pressure sensitive variable resistance layer 6 printed on the electrical contact 7 behind each projection. An electrical conductor 8 is formed as a thin film on the input plate 4 behind each projection to raise conductivity. When pressure is applied to a projection, the variable resistance layer is compressed causing its resistance to decrease, and current flows.

The pressure-sensitive variable resistance layer 6 is made of a mixture of a compressible material such as silicone rubber with a conductive material such as carbon black, carbon fiber, or graphite. This material has high resistance or is non-conductive when pressure is not applied, but it is conductive in proportion to pressure applied.

As shown in FIGS. 4 and 5A, twelve projections 11-22 are made by integral molding in the input plate 4. When the input array is used on the back of a PDA, the twelve projections correspond respectively to "3", "2", "1", "6", "5", "4", "9", "8", "7", "#", "0", "*". This is because the array will be operated facing away from the user, so the inputs are laterally mirrored to match their normal positions as seen from the front of the PDA. If the input array is used on the front of a PDA, the twelve projections 11-22 correspond respectively to "1", "2", "3", "4", "5", "6", "7", "8", "9", "*", "0", "#". These two preferred layouts are not essential, but are desirable because users are familiar with this convention.

FIG. 6 shows an example of preferred dimensions for an input plate. The lateral pitch of the projections is 7.0 mm, which is within the previously mentioned range of 4.5 mm to 8.0 mm, and the vertical pitch is 6.5 mm, which is within the previously mentioned range of 4.0 mm to 7.0 mm. The width of the input plate is 20 mm and the height is 25 mm. The projections 11-22 are generally hemispherical with a height h of 1.0 mm and a diameter of 2.5 mm. Projection 15 is smaller, with a height h of 0.5 mm and a diameter of 1.8 mm. Projections 15 provides a home position for the fingertip that can be recognized by the tactile sense of the user. The projections need not be perfect hemispheres.

FIGS. 7A1-7D2 show the projections protruding through individual holes in the back of the case of a Personal Digital Assistant. The back surface of the case need not be perfectly flat. It may have a curved or featured surface. Using this approach, an input plate does not necessarily need to be customized to conform to an existing curved surface of a given PDA.

A home position on the projections can be recognized by a surface feature on the input plate or on the back surface of a PDA, rather than by a smaller projection 15. FIGS. 7A1 and 7A2 show a circular depression S1 around a home position. FIGS. 7B1 and 7B2 show an oval depression S2. FIGS. 7C1 and 7C2 show the whole projection array mounted in a sunken area with a raised circumference S3. FIGS. 7D1 and 7D2 show a ridge S4 along the top row of projections, which are longer than the other projections. Any of these types of surface features are easily sensed by the user to guide the fingertip position. The last version S4 has the additional advantage of providing a higher row of projections where the finger is extended, making operation easy.

FIG. 6 shows a fingertip with a width D centered on input projection 15. Width D will be termed herein the fingertip representation size. This is the average breadth of an index fingerprint of a given of a given population. Fingertip sizes differ by age, sex, race, and other demographic factors. Adult Asians have an index fingertip representation size D of 10 mm to 18 mm for men, and 10 mm to 15 mm for women.

For example, an average width D of 12 mm for adult Asian women can be used. The width of curve C1 for the input plate must be within 2 to 3 times this size. The usable curve C1 should have a width of 22 mm to 28 mm and a height of 24 mm to 30 mm. The preferable curve C2 is a little smaller, and it may have a height of 22 mm or less. It is preferable to use a fingertip representation size D of an adult of the country where the present input device will be used.

To learn to operate the input device, a user moves the center of an effective fingertip, such as an index finger, to the home position on projection 15. The user then moves this fingertip within its limits in all directions, imagining the array of keys as shown in FIG. 5B. The user then explores and presses projections 11-14 and projection s 16-22. A new user can become proficient and precise with this input device with relatively little training.

Figure 9:
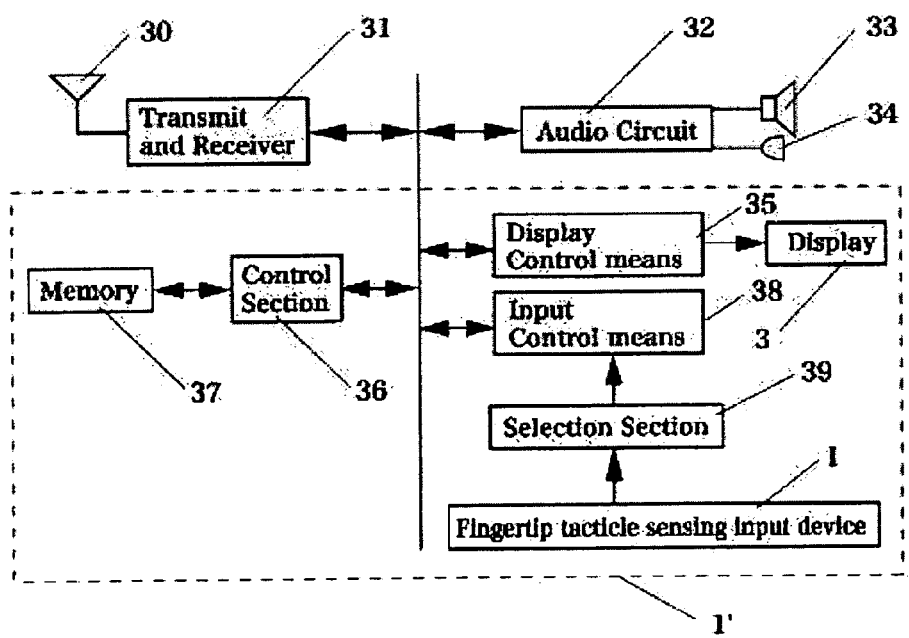
FIG. 9 is a block diagram of components of a Personal Digital Assistant using the present tactile-sense input device.

A block diagram of a Personal Digital Assistant 2 using this invention is shown in FIG. 9. Components 1' required for input operations are outlined. An antenna 30 is mounted on the case. A radio transceiver 31 processes radio signals transmitted and received by the antenna. A voice circuit 32 includes a MIDI function and a phonetic function. A loudspeaker 33 provides audio output. A microphone 34 provides voice input. A display screen 3 such as an LCD panel is provided. A display control means 35 displays various information such as telephone numbers on the display screen. The display control means 35 also displays the input when the present fingertip tactile sense input device is used. A control section 36 controls the PDA as a whole. A memory 37 stores various programs and data, which are loaded into a control section 36. An input control means 38 encodes the input signal from the fingertip tactile sense input device 1, and sends it to the control section.

With this input device, a fingertip is only slightly moved on the input plate. Therefore, a user may press two projections simultaneously. The strongest input signal is selected by a selection section 39. It identifies the projection that is pressed most strongly by comparing the amount of current it receives from among the contacts of projections 11-22 that have moved above a voltage threshold. It latches the strongest input and passes an identification signal to the input control means. It cancels when it cannot choose.

In response, the input control means 38 encodes a data representation of the projection producing the selected input signal. This can be an alphanumeric character in ASCII or JIS code or the like that is passed to the display by the control section 36. If the user accepts the displayed character, he or she can push the same projection again to confirm. Otherwise, the user pushes a different projection to correct. An input will automatically confirm after a predetermined time elapses without a change. Thus, the display is used to visually check the input as it occurs. Preferably an audible check of input is also offered by means of the voice circuit and loudspeaker.

The present fingertip tactile sense input device can be used not only for a Personal Digital Assistant but also for other information terminals and electronic equipment. The size of a key button is extremely reducible by providing means such as described herein to check the input.

Figure 10A:
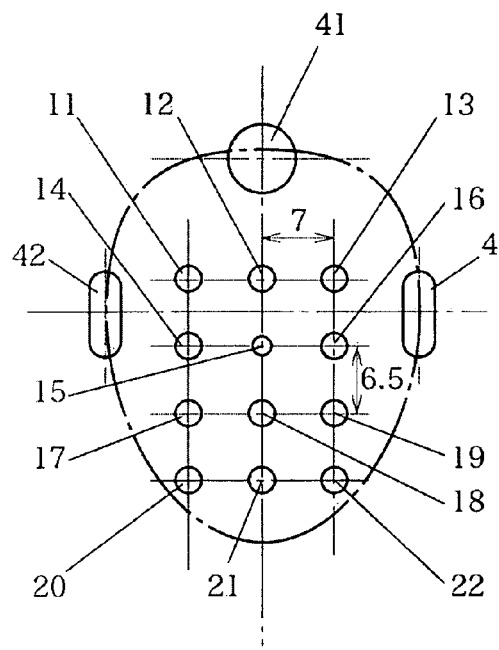
FIG. 10A is a front view of a tactile-sense input device according to the invention with additional keys.

Function keys can be provided in addition to the basic input projections. FIG. 10A shows an arrangement of input projections 11-22 and additional keys 41-43. The input projections are spaced 7.0 mm laterally and 6.5 mm vertically. A navigation key 41 is used to choose an item from a displayed menu. It is located on curve C1 at top center. Function keys 42 and 43 are used to direct various functions. They are arranged on curve C1, equidistantly left and right from the home projection 15 and ½ pitch above it. The navigation and function keys may be larger than the basic projection keys as in FIGS. 10A and 10B, or they may be arranged like a conventional key button structure 122 of FIG. 12.

Figure 10B:
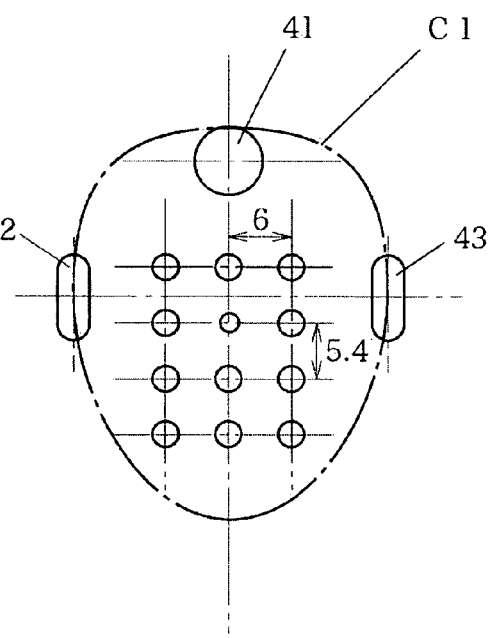
FIG. 10B is a view similar to FIG. 10A with smaller spacing between the input projections. jections.
Figure 11:
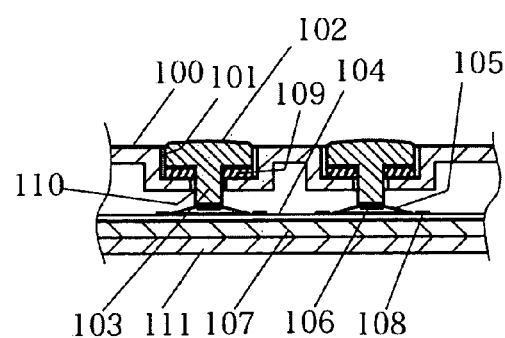
FIG. 11 is a prior art side sectional view of the structure of a conventional key button array.

FIG. 10B shows a similar arrangement with smaller spacing of input projections. The input projections are spaced 6.0 mm laterally and 5.4 mm vertically. The navigation key 41 is located just within C1 and centered above the projections.

To minimize fingertip movement, the navigation key 41 and function keys 42-43 can be positioned within curve C2. However, this brings the additional keys close to the basic input projections. Therefore, it is desirable to locate less frequently used keys, such as the navigation key, in the area between curves C1 and C1. This provides fingertip access to them yet spaces them from the basic input projections.

When the spacing between projections is larger, as in FIG. 10A, it is easier to recognize individual projections by touch, but the required movement of the fingertip is larger. When the spacing between projections is smaller, as in FIG. 10B, recognition of individual projection by touch is harder, but operability is better because a fingertip can move more surely within a smaller range.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claimed:

1. A fingertip tactile sense input device comprising:
   an input plate with a plurality of projections, each projection having a front end for receiving pressure contact by a human fingertip, and each projection having a back end;
   the projections arranged in a surface area defined by the range of motion on a surface by a human fingertip with the wrist fixed;
   an electrical input circuit on the back end of each projection;
   a pressure sensitive variable resistor in each input circuit;
   a selection circuit electrically connected to the input circuits that identifies which one of the projections is being pressed the hardest, including when two or more of the projections are pressed simultaneously; and
   input control means, electrically connected to the selection circuit, that encodes a unique electronic representation of each projection identified by the selection circuit.

2. The fingertip tactile sense input device of claim 1, wherein at least twelve projections are provided corresponding to digits 0-9 and characters "*" and "#".

3. The fingertip tactile sense input device of claim 2, wherein the at least twelve projections are arrayed in rows and columns, with lateral spacing of the columns in a range of 4.5 mm to 8.0 mm, and vertical spacing of the rows in the range of 4.0 mm to 7.0 mm.

4. The fingertip tactile sense input device of claim 1, wherein the surface area has a height of 24 mm to 28 mm and a width of 22 mm to 28 mm.

5. The fingertip tactile sense input device of claim 1, wherein the input plate is flexible, and the projections are integrally molded with the input plate.

6. The fingertip tactile sense input device of claim 1, wherein a given one of the projections is smaller than the other projections to indicate a home position to the tactile sense.

7. The fingertip tactile sense input device of claim 6, further comprising a menu navigation key centered above the projections and two additional function keys equidistant on the left and right from the home position.

8. The fingertip tactile sense input device of claim 1, further comprising:
   a handheld portable electronic device with a front surface and a back surface;
   a display screen on the front surface of the portable handheld electronic device;
   the input plate mounted in the back surface of the portable handheld electronic device;
   a control section in the handheld portable electronic device that is electrically connected to the input control means and to the display screen;
   the control section causing the screen to display a visual representation of each projection when it is identified by the selection circuit;
   the visual representation of the identified projection being displayed in a position on the screen corresponding to the location of the identified projection relative to the other projections.

9. A tactile sense input device comprising:
   an array of projections protruding from a surface, each projection having a rounded front end for receiving pressure contact from a moving human fingertip, and each projection having a known spatial position relative to the other projections in the array;
   the projections arranged in an area defined by the range of motion on a surface by a human fingertip with the wrist fixed, the array of projections equally usable with a right or left hand without rotation or reversal of the away of projections;
   an electrical input circuit behind each respective projection;
   variable resistance means for producing an electric current in each input circuit in proportion to pressure by a human fingertip on the respective projection;
   a selection circuit that compares electrical current strengths among the input circuits, and identifies the input circuit with the strongest current, including when two or more of the projections are pressed simultaneously;
   an input controller, electrically connected to the selection circuit, that encodes a digital representation for each input circuit identified by the selection circuit;
   an input/output control section electrically connected to the input controller and to a display screen that causes the screen to display a visual representation of each unique digital representation when it is encoded by the input controller;

each unique visual representation displayed in a position on the screen corresponding to the spatial position of the respective projection that caused it.

10. The tactile sense input device of claim 9, wherein the array of projections limited to an area with a lateral dimension of about 28 mm and a vertical dimension of about 30 mm.

11. The fingertip tactile sense input device of claim 9, wherein the input plate is flexible, and the projections are integrally molded with the input plate.

12. The tactile sense input device of claim 9, further comprising a navigation key centered above the projections and a left and right function key.

13. The tactile sense input device of claim 9, further comprising:
a personal digital assistant having an outer case with front and back surfaces;
wherein the display screen is mounted on the front surface of the outer case, and
the plurality of projections is mounted on the back surface of the outer case.

14. The tactile sense input device of claim 13, wherein the projections protrude through individual holes in the back surface of the outer case of the personal digital assistant.

15. The tactile sense input device of claim 13, wherein a home position for a fingertip is indicated by a surface feature on the back surface of the outer case of the personal digital assistance.

16. A fingertip tactile sense input device comprising:
a handheld portable electronic device with a front surface, a back surface, and first and second side surfaces;
a display screen on the front surface of the portable handheld electronic device;
an input plate mounted on the back surface of the handheld portable electronic device, the input plate comprising a plurality of projections, each projection comprising a distal end and a proximal end;
the projections arranged within an area of the input plate defined by the range of motion of the tip of the index finger of a human hand gripping the portable electronic device between the thumb of the hand on the first side surface thereof and at least one other finger of the hand on the second side surface thereof, and wherein the projections are equally usable by the index finger of a right or left hand without rotation or reversal of the input plate;
an electrical input circuit on the proximal end of each projection;
a pressure sensitive variable resistor in each input circuit;
a selection circuit electrically connected to the input circuits that identifies which one of the projections is being pressed the hardest, including when two or more of the projections are pressed simultaneously; and
an input controller, electrically connected to the selection circuit, that encodes an electronic representation of each projection identified by the selection circuit.

17. The fingertip tactile sense input device of claim 16 further comprising:
an input/output control section, electrically connected to the input controller and to the display screen, that causes the screen to display a visual representation of each electronic representation in a position on the screen corresponding to the relative spatial position of the respective projection in the plurality of projections.

* * * * *